United States Patent
Symanow et al.

(10) Patent No.: US 10,611,258 B2
(45) Date of Patent: Apr. 7, 2020

(54) BATTERY RECHARGE NOTIFICATION AND AUTOMATIC RECHARGE

(71) Applicant: FORD GLOBAL TECHNOLOGIES, LLC, Dearborn, MI (US)

(72) Inventors: David Anthony Symanow, Plymouth, MI (US); Derek Hartl, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 630 days.

(21) Appl. No.: 15/352,006

(22) Filed: Nov. 15, 2016

(65) Prior Publication Data

US 2018/0134176 A1    May 17, 2018

(51) Int. Cl.
*H02J 7/00*    (2006.01)
*B60L 53/10*    (2019.01)
(Continued)

(52) U.S. Cl.
CPC ............ *B60L 11/1868* (2013.01); *B60K 6/28* (2013.01); *B60L 50/16* (2019.02); *B60L 50/61* (2019.02);
(Continued)

(58) Field of Classification Search
CPC ...... B60L 11/1868; B60L 58/20; B60L 58/12; B60L 50/16; B60L 50/61; B60L 2240/44;
(Continued)

(56) References Cited

U.S. PATENT DOCUMENTS 5,334,926 A * 8/1994 Imaizumi ............. H02J 7/1423
320/104
9,060,213 B2 6/2015 Jones
(Continued)

OTHER PUBLICATIONS

IF—Connect Your Car to Everything. IF by IFTTT is an app for Android and iOS devices that enables you to create powerful connections between your Mojio device and other popular apps and services with one simple statement—IF THIS THEN THAT. Last accessed Jun. 24, 2016.
(Continued)

*Primary Examiner* — Rexford N Barnie
*Assistant Examiner* — Terrence R Willoughby
(74) *Attorney, Agent, or Firm* — Michael J. Spenner; Brooks Kushman P.C.

(57) ABSTRACT

A vehicle includes a low-voltage battery, a high-voltage battery, and a converter that decreases voltage provided from the high-voltage battery to the low-voltage battery. A system controller of the vehicle is programmed to use the converter, in a key-off cycle, to charge the low-voltage battery a calibrated number of times that the low-voltage battery drops below a predefined state-of-charge threshold, and send a wireless notification a subsequent time the low-voltage battery drops below the threshold. A notification is sent to a predefined contact address when a periodically computed state of charge of a low-voltage battery of a vehicle falls below a predefined threshold. Using a converter, voltage provided from a high-voltage battery of the vehicle to the low-voltage battery is decreased to charge the low-voltage battery responsive to receipt from the contact address of a response indicating approval of the charge.

19 Claims, 6 Drawing Sheets

(51) Int. Cl.

| | |
|---|---|
| *B60L 53/22* | (2019.01) |
| *B60L 11/18* | (2006.01) |
| *H04W 4/14* | (2009.01) |
| *B60W 20/13* | (2016.01) |
| *B60W 50/14* | (2020.01) |
| *B60L 58/12* | (2019.01) |
| *B60W 10/24* | (2006.01) |
| *B60K 6/28* | (2007.10) |
| *B60W 10/26* | (2006.01) |
| *B60W 20/14* | (2016.01) |
| *B60L 58/20* | (2019.01) |
| *B60L 50/61* | (2019.01) |
| *B60L 50/16* | (2019.01) |
| *H04L 29/08* | (2006.01) |
| *H02J 7/14* | (2006.01) |
| *H04W 4/40* | (2018.01) |

(52) U.S. Cl.
CPC .............. *B60L 58/12* (2019.02); *B60L 58/20* (2019.02); *B60W 10/24* (2013.01); *B60W 10/26* (2013.01); *B60W 20/13* (2016.01); *B60W 20/14* (2016.01); *B60W 50/14* (2013.01); *H04W 4/14* (2013.01); *B60L 2240/44* (2013.01); *B60L 2250/10* (2013.01); *B60L 2250/16* (2013.01); *B60W 2550/40* (2013.01); *B60W 2750/40* (2013.01); *H02J 7/0021* (2013.01); *H02J 7/0047* (2013.01); *H02J 7/1423* (2013.01); *H04L 67/12* (2013.01); *H04M 2203/45* (2013.01); *H04W 4/40* (2018.02); *Y02D 70/00* (2018.01); *Y02D 70/142* (2018.01); *Y02D 70/144* (2018.01)

(58) Field of Classification Search
CPC . B60L 2250/16; B60L 2250/10; B60W 50/14; B60W 20/13; H02J 7/007; H02J 7/0021; H02J 2007/0096; H04W 4/14; H04W 4/40; Y02D 70/00; Y02D 70/144; Y02D 70/142; H04L 67/12; H04M 2203/45
See application file for complete search history.

(56) References Cited

U.S. PATENT DOCUMENTS

| | | |
|---|---|---|
| 9,251,631 B2 | 2/2016 | Thompson et al. |
| 2013/0187590 A1* | 7/2013 | Ferrel ................... H02J 7/1423 320/104 |
| 2014/0018975 A1* | 1/2014 | Maslyn ................. H01M 10/44 701/2 |
| 2017/0166079 A1* | 6/2017 | Saucke ................... B60L 58/12 |

OTHER PUBLICATIONS

ITunes preview of CarLock by RS5 ltd. CarLock is the easiest way to make your car a connected car. Last accessed Jun. 24, 2016.

* cited by examiner

BATTERY RECHARGE NOTIFICATION AND AUTOMATIC RECHARGE

TECHNICAL FIELD

Aspects of the disclosure generally relate to battery recharge notification and automatic battery recharge.

BACKGROUND

A hybrid-electric vehicle (HEV) may include a high-voltage (HV) battery system and a low-voltage (LV) battery system. The HV battery system may include a traction battery used to power electric machines to propel the vehicle. The low-voltage system may include a low-voltage battery relied upon for headlights, door actuators, and other electrical systems of the vehicle unrelated to the traction motor. Many HEVs rely upon the LV battery system to actuate closure of electrical contacts that connect the HV battery to the electrified powertrain. In some situations, if the LV battery is discharged or faulty, the HEV may be unable to move.

SUMMARY

In one or more illustrative embodiments, a vehicle includes a low-voltage battery; a high-voltage battery; a converter that decreases voltage provided from the high-voltage battery to the low-voltage battery; and a system controller programmed to use the converter, in a key-off cycle, to charge the low-voltage battery a calibrated number of times that the low-voltage battery drops below a predefined state-of-charge threshold, and send a wireless notification a subsequent time the low-voltage battery drops below the threshold.

In one or more illustrative embodiments, a method includes sending a notification to a predefined contact address responsive to a periodically computed state of charge of a low-voltage battery of a vehicle falling below a predefined threshold; and using a converter decreasing voltage provided from a high-voltage battery of the vehicle to the low-voltage battery to charge the low-voltage battery responsive to receipt from the contact address of a response indicating approval of the charge In one or more illustrative embodiments, a non-transitory computer-readable medium comprising instructions that, when executed by a processor, cause the processor to responsive to identification that the vehicle is connected to a local-area network, send a message over a local-area network to an address of a user of a vehicle indicating that a low-voltage battery had dropped below a threshold; responsive to identification that the vehicle is connected to the wide-area network but not the local-area network use a cellular modem of the vehicle to send the message over a wide-area network to the address; and decrease, using a converter, voltage provided from a high-voltage battery of the vehicle to the low-voltage battery to charge the low-voltage battery responsive to receipt from the address of a response indicating approval of the charge.

DETAILED DESCRIPTION

Figure 1:
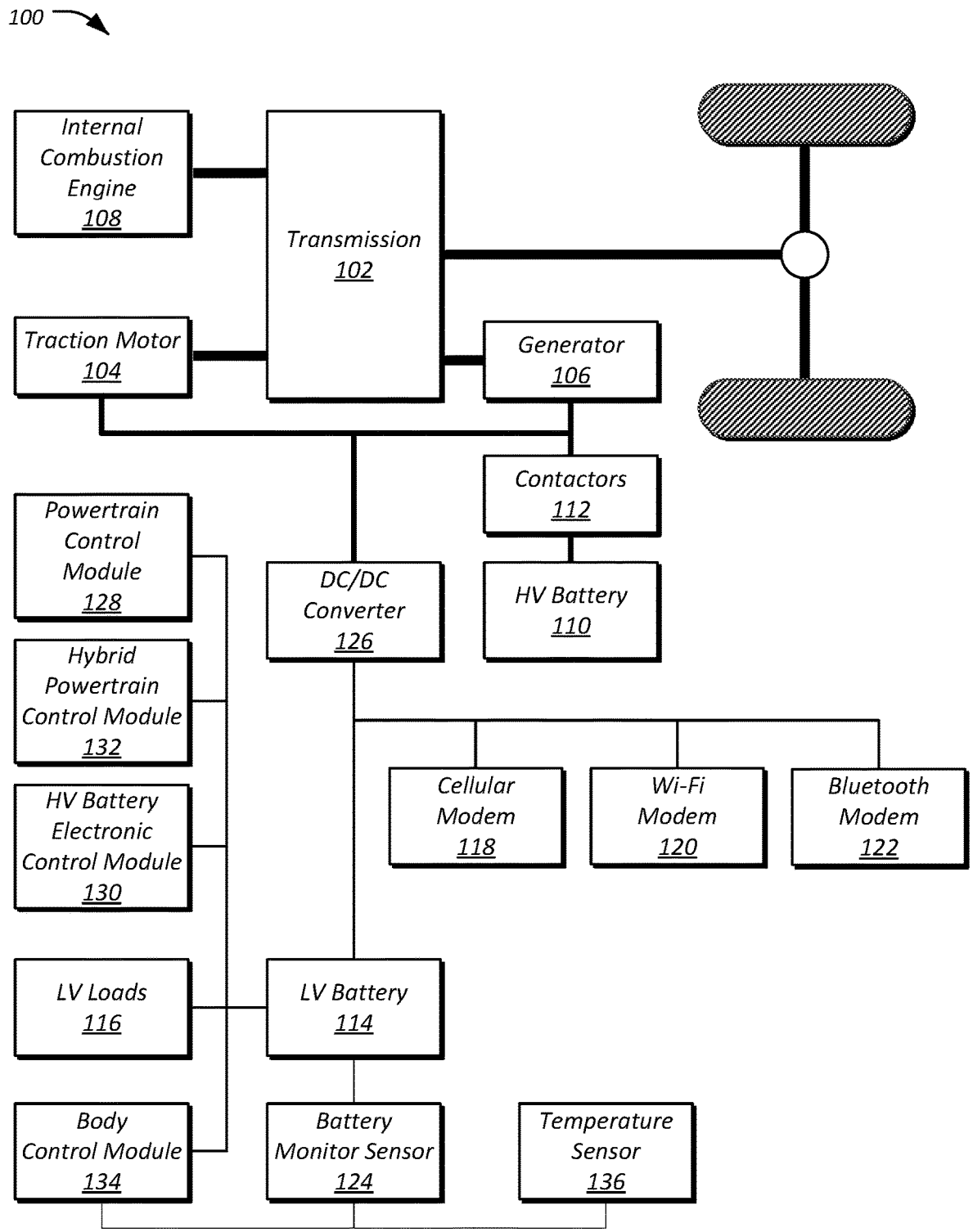
FIG. 1 illustrates an example hybrid electric vehicle (HEV) according to an embodiment of the present disclosure.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

HEVs may be unable to start when the LV battery has been discharged to a low state-of-charge (SoC). When this occurs, the vehicle is rendered undriveable, and the customer (or dealer) may have to jump-start the vehicle or have the vehicle towed to a repair facility.

Moreover, autonomous vehicles rely on the low-voltage battery for electrical power if a DC/DC converter from the high-voltage system to the low-voltage system fails. In such a condition, the low-voltage battery must provide sufficient power to allow the vehicle to reach a "safe-harbor" location. In order to ensure this, the low-voltage battery SoC must be above a specific level, and the low-voltage battery health must be adequate. If not, there may be insufficient battery energy to power the autonomous systems to reach the safe-harbor location. If the SoC is below that minimum threshold (or battery health is inadequate), the vehicle may be prohibited from being used until the low-voltage battery is recharged (or replaced), hence a notification is needed. The autonomous vehicles may be kept in a depot where there may potentially be dozens or hundreds of vehicles, so automated reporting may be critical.

Customer real-world usage profiles may also result in chronic low-voltage battery SoC. This may occur because some HEV customers have predominantly short drive cycles. The duration of these drive cycles may be too short in duration to allow the vehicle electrical system to fully recharge the LV battery after it has been discharged during a key-off event. Over time, multiple cycles of key-off events followed by short drive cycles can reduce the LV battery SoC to a low level. Eventually, even a short key-off cycle can reduce the battery SoC to a level where closing the high-voltage battery contactors becomes problematic.

Additionally, potential damage to HEV low-voltage batteries may occur due to deep-discharge during extended vehicle storage at the vehicle assembly plant and/or the dealership. This may be a result of typical dealer handling of HEVs prior to delivery to the customer. If the vehicle is parked for extended periods of time, key-off electrical loads can discharge the battery to a low SoC. This occurs at vehicle assembly plants and dealerships because the combination of post-manufacture storage, vehicle transport, and dealer storage can result in lengthy periods of time (several weeks) in which the vehicle is left key-off. If during this period the low-voltage battery is deeply discharged, the battery can undergo irreversible damage that decreases the battery capacity. If so, the vehicle may be delivered to the customer with a compromised battery with diminished capacity and adverse electrical characteristics (e.g., low charge acceptance), which may result in an early service repair under warranty.

To address these issues, existing communication devices in the vehicle may be utilized to provide notifications to the dealer and/or customer, to alert the dealer, customer, and/or fleet manager when the LV battery SoC is at a low level. The dealer/customer/fleet manager may then take actions to charge the battery. As an example action, if the vehicle has been delivered to a customer, the customer can start the vehicle for a short period of time (e.g., 20-30 minutes). Or, in PHEVs and BEVs, the customer can connect the vehicle to a high-voltage battery charger (which also charges the low-voltage battery). In another example action, if the vehicle remains at a dealership, is stored at an assembly plant, or is part of a fleet, the LV battery may additionally or alternately be recharged using an external LV battery charger.

By providing these notifications, customers, rental car companies, dealers, fleet managers, and vehicle assembly plants are provided a simple and effective means to prevent LV batteries from have an unusably low SoC or poor low-voltage battery health. By ensuring LV batteries have an adequate SoC, circumstances in which a vehicle is undriveable due to an inability to close the low-voltage contactors (HEVs) or use the starter motor (conventional vehicles) may be reduced. Moreover, by ensuring autonomous vehicles have adequate low-voltage battery SoC and battery health, autonomous vehicles may be able to proceed to a safe-harbor location in the event that that DC/DC converter system of the autonomous vehicle is unable to continue to power the autonomous systems.

In an example, the notifications and other operations described herein may be implemented using existing vehicle hardware through the addition of software similar to that used for in-vehicle notifications through message centers, clusters, and multipurpose displays. The cost of detecting and correcting deeply discharged low-voltage batteries is reduced for activities that manage large numbers of vehicles (e.g., dealers, rental car companies, and vehicle assembly plants) by providing an automated means of recharging the battery using resources in the vehicle. Vehicle warranty costs are reduced through the avoidance of deeply-discharged or dead battery events when the vehicle is stored unattended for lengthy periods of time (e.g., allowing a battery to completely discharge can cause hidden damage which results in early warranty returns). Further aspects of the disclosure are described in detail below.

FIG. 1 illustrates an example hybrid electric vehicle (HEV) 100 according to an embodiment of the present disclosure. FIG. 1 illustrates representative relationships among the components. Physical placement and orientation of the components within the vehicle may vary. The vehicle 100 includes a transmission 102 and is propelled by at least one electric machine 104, 106 with selective assistance from an internal combustion engine 108. As shown, the transmission 102 may be a power-split configuration, in that the transmission 102 includes the first electric machine 104 and a second electric machine 106. The electric machine(s) 104, 106 may be alternating current (AC) electric motors in an example. The electric machine 104 receives electrical power and provides torque for vehicle propulsion. The second electric machine 106 also functions as a generator for converting mechanical power into electrical power and optimizing power flow through the transmission 102. In other embodiments, the transmission 102 does not have a power-split configuration, and may utilize only a single electric machine for propulsion and generation. It should be understood that the schematic illustrated in FIG. 1 is merely exemplary and is not intended to be limited. Indeed, other configurations of engine 108 and electric machines 104, 106 to transmit power through the transmission 102 are contemplated.

The vehicle 100 includes an energy storage device, such as a traction HV battery 110 for storing electrical energy. The traction battery 110 is a high-voltage battery that is capable of outputting electrical power to operate the electric machines 104, 106. The HV battery 110 also receives electrical power from the electric machines 104, 106 when they are operating as generators. The HV battery 110 is a battery pack made up of several battery modules (not shown), where each battery module contains a plurality of battery cells (not shown). A high-voltage bus electrically connects the HV battery 110 to the electric machines 104, 106 through contactors 112, such that the HV battery 110 is connected to the electric machines 104, 106 when the contactors 112 are electrically engaged, and is disconnected from the electric machines 104, 106 when the contactors 112 are electrically disengaged.

The vehicle 100 also includes a LV battery 114 connected to a low-voltage bus powering low-voltage loads 116 of the vehicle 100. As some examples, the low-voltage loads 116 may include a cellular modem 118, a WiFi modem 120, and a BLUETOOTH modem 122. A battery monitor sensor 124 is connected to the low-voltage battery 114, and provides a voltage measurement signal that may be used to measure and/or calculate the SoC of the low-voltage battery 114. A temperature sensor 136 is also provided within the vehicle 100 to provide a signal indicative of the temperature of the surroundings of the LV battery 114 and/or of the vehicle 100.

The vehicle 100 also includes a DC-DC converter 126 or variable voltage converter (VVC). The converter 126 is electrically connected between the high voltage bus (connecting the traction battery 110 and the first electric machines 104, 106) and the low voltage bus system powered by the low-voltage battery 114. The converter 126 "bucks" or decreases the voltage potential of the electrical power provided from the high-voltage battery 110 to the low-voltage battery 114. The converter 126 may also "boost" or increase the voltage potential of the electrical power provided by the low-voltage battery 114 to power the high-voltage battery 110 side of the converter 126 in some embodiments.

The vehicle 100 further includes various controllers configured to manage the operation of the drive components of the vehicle 100. As shown, the vehicle 100 includes a powertrain control unit (PCU) 128 configured to control the engine 108; a hybrid powertrain control module (HPCM) 130 configured to control the transmission 102; a high-voltage battery electronic control module (BECM) 132 configured to control the high-voltage battery 110, contactors 112, and other high-voltage components; and a body control module (BCM) 134 configured to manage ancillary low-voltage functions of the vehicle 100 such as headlights and door locks.

While each of these controllers is illustrated as independent controllers, the PCM 128, HPCM 130, BECM 132, and BCM 134 may each be part of a larger control system and may be controlled by one another or by various other controllers throughout the vehicle 100. It should therefore be understood that the PCM 128, HPCM 130, BECM 132, and BCM 134 and one or more other controllers can collectively be referred to as a "system controller." This system controller controls various actuators in response to signals from various sensors to control functions such as starting/stopping the engine 108, operating the electric machines 104, 106 to provide wheel torque or charge the high-voltage battery 110, select or schedule transmission shifts with the transmission 102, etc. The controller or controllers may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The system controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, the system controller may communicate signals to and/or from the transmission 102, electric machines 104, 106, engine 108, contactors 112, converter 126, and battery monitor sensor 124. Representative examples of parameters, systems, and/or components that may be directly or indirectly actuated using control logic executed by the system controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charger, regenerative braking, motor/generator operation, clutch pressures for the transmission 102, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by the system controller may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCM 128 in one example. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 2:
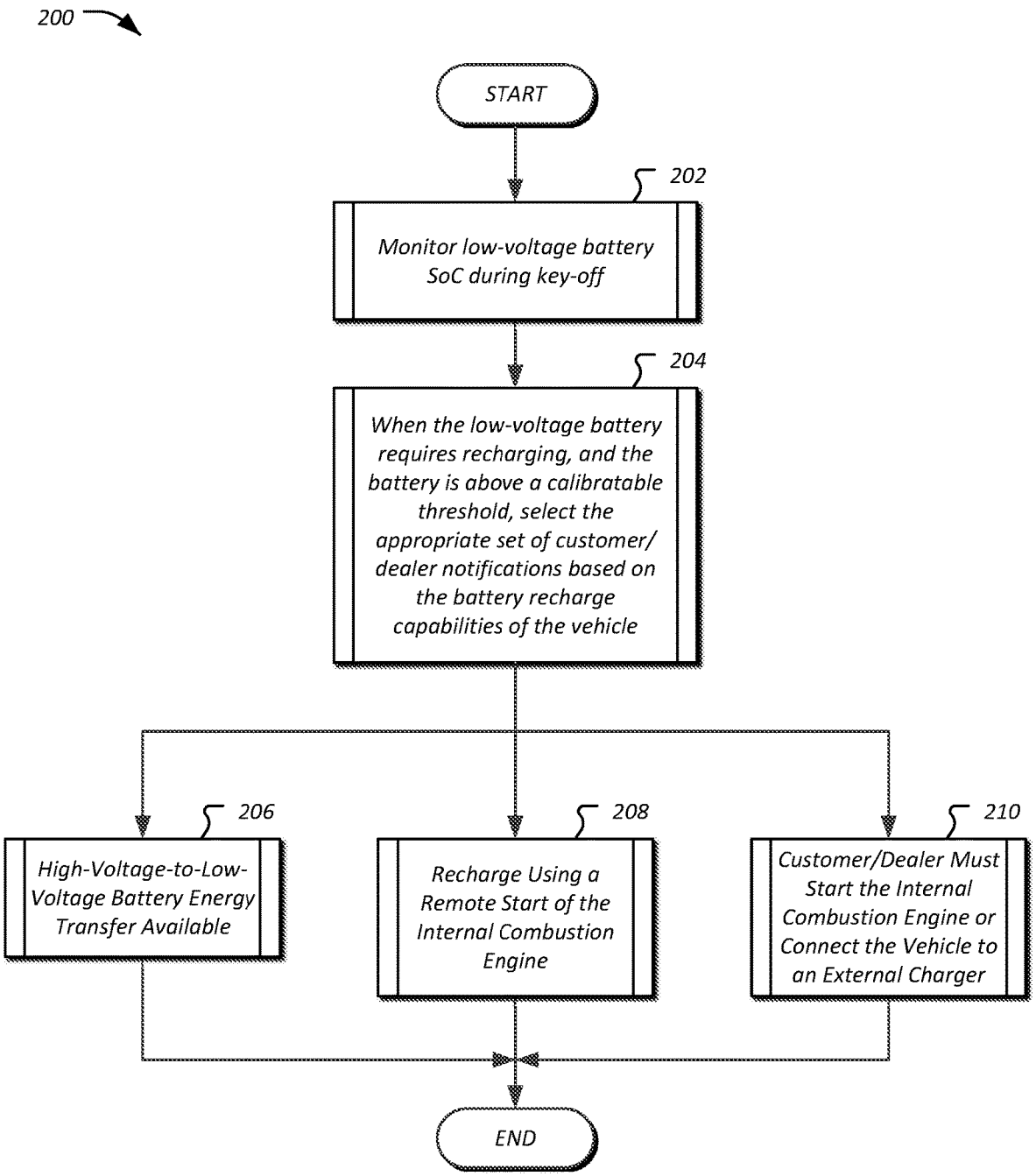
FIG. 2 illustrates an example process for accounting for conditions during which the state of charge of the low-voltage battery is at a low level.

FIGS. 2-6 illustrate example processes for accounting for conditions during which the SoC of the low-voltage battery 114 is at a low level. FIG. 2 illustrates an overview process 200, where each of the operations 202-210 of the process 200 is described in detail with respect to one of the processes 300-600 of FIGS. 3-6 below. The processes 200-600 may be implemented using the system controller described in detail above.

At operation 202, the system controller implements feature initialization and monitoring of the SoC of the low-voltage battery 114. At operation 204, the system controller performs notification of a determination to recharge the LV battery 114 and requests for permission to use a low-voltage-to-high-voltage battery energy transfer to recharge the LV battery 114. Aspects of the operations 202 and 404 are described in detail in the process 300 of FIG. 3.

Operations 206, 208, and 210 include various potential actions when notifications are desired. Operation 206 includes HV-LV energy transfer, and is described in detail in the process 400 of FIG. 4. Operation 208 includes remote engine start, and is described in detail in the process 500 of FIG. 5. Operation 210 includes customer action to connect the vehicle 100 to an external charger, and is described in detail in the process 600 of FIG. 6. It should be noted that in implementation of these features, these actions may be presented to the customer serially (e.g., ask for permission for HV-LV transfers and, if declined, ask for permission for a remote engine start) or substantially at the same time.

For sake of explanation, Table 1 illustrates a set of variables used in the description of FIGS. 3-6. Each variable is indicated by a name of the variable, a purpose describing the user of the variable, and with an indication of whether the variable is calibratable or configurable by a user or owner of the vehicle 100. It should be noted that the variables described herein may be stored to one or more of the various types of computer readable storage devices or media described herein, and may be in communication with the one or more microprocessors or CPUs of the system controller.

TABLE 1

| No. | Name | Purpose | Calibratable? |
|---|---|---|---|
| 1 | customer-dealer_batt_charge_notification_enabled | Logical flag that indicates whether the low-voltage battery low SoC notification is enabled | Y |
| 2 | LV_SoC_monitor_timer | Timer used to control the frequency at which the low-voltage battery SoC is checked to see if a customer notification is required. | N |
| 3 | LV_SoC_monitor_interval | Interval at which the low-voltage battery SoC will be checked when the vehicle is key-off. | Y |
| 4 | current_LV_battery_SoC | Low-voltage battery state-of-charge as measured by the battery monitor sensor. | N |
| 5 | request_LV_battery_recharge_threshold | Low-voltage battery SoC that triggers the start of the notification process. | Y |
| 6 | remote_energy_transfers_enabled | Logical flag used by the system controller to enable/disable the use of high-voltage-to-low-voltage battery energy transfers. | Y |
| 7 | remote_start_batt_charging_enabled | Logical flag used by the system controller to enable/disable the use of remote engine starts to charge the low-voltage battery. | Y |
| 8 | cellular_modem_notifications_enabled | Logical flag used by the system controller to enable/disable the use of the cellular modem to send notifications to the customer. | Y |
| 9 | text_message_notifications_enabled | Logical flag used by the system controller to enable/disable the use of the cellular modem to send text message notifications to the customer. | Y |
| 10 | voice_mail_notifications_enabled | Logical flag used by the system controller to enable/disable the use of the cellular modem to send voice mail notifications to the customer. | Y |
| 11 | WiFi_notifications_enabled | Logical flag used by the system controller to enable/disable the use of WiFi to send text message notifications to the customer. | Y |
| 12 | notification_timer | Timer used by the system controller to periodically send notifications to the customer if the customer has not responded to prior notification messages. | Y |
| 13 | notification_count | Indicates the count of notification messages sent. | Y |
| 14 | max_notification_count | Set the maximum number of notification messages to the customer. | Y |
| 15 | contact_address | Includes a phone number, e-mail address, or other contact information to receive notifications | Y |

Figure 3:
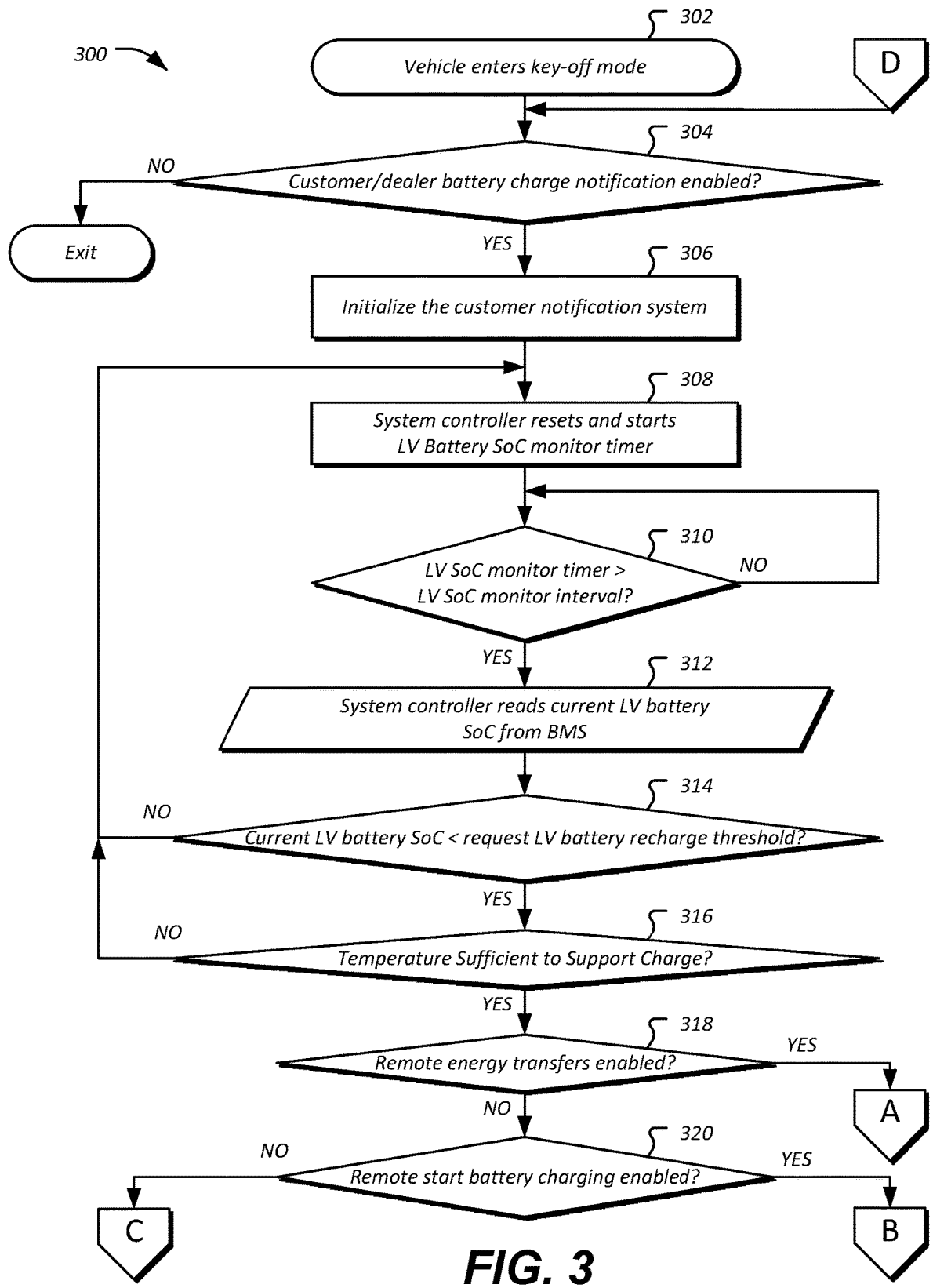
FIG. 3 illustrates an example process for feature initialization and detection of battery low state-of-charge.

FIG. 3 illustrates an example process 300 for feature initialization and detection of battery low state-of-charge. At 302, the vehicle 100 enters key-off mode. In an example, the system controller may identify that the vehicle 100 is in key-off mode according to inputs to the BCM 134 indicative of the status of the key.

At 304, the system controller determines whether the low-battery notification feature is enabled or disabled. For example, the customer and dealer have the option of disabling this feature through a vehicle user interface of the vehicle 100. This user interface may include one or more of a message center, an audio system, a telematics system screen (such as that of the SYNC system provided by FORD MOTOR COMPANY), or similar devices. As another example, the notification feature may be enabled or disabled at the vehicle assembly plant, or dealer service bay, through an on-board diagnostics connector of the vehicle 100 (e.g., via OBD-II).

To determine whether the low-battery notification feature is enabled or disabled, in an example the system controller accesses the customer-dealer_batt_charge_notification_enabled logical flag, which is set to a first value (e.g., TRUE) to enable the low-voltage battery low SoC notification, and is set to a second value (e.g., FALSE) to disable the low-voltage battery low SoC notification. If the low-battery notification feature is enabled, control passes to operation 306. Otherwise, the process 300 ends.

At 306, the system controller initializes the low-battery notification feature. For instance, the low-battery notification feature may have various capabilities whose operation may be configured through initialization. As an example, these capabilities may include to enable or disable low-voltage battery recharging using high-voltage-to-low-voltage battery energy transfers via the converter 126.

With respect to configuration of the energy transfer capability, the system controller may be configured to determine, for each key-off event, whether to enable HV-LV energy transfers as a mechanism for recharging the LV battery 114. Factors in this determination may include SoC of the HV battery 110 and ambient temperature of the vehicle 100. Ambient temperature may be a factor because at low temperature, charge acceptance of the LV battery may be low, and therefore energy transfer to the LV battery 114 may be of little to no effective benefit.

As another possibility, the vehicle assembly plant can temporarily disable the feature for all key-cycles if low-voltage battery SoC reporting is not wanted or needed at the assembly plant. Or, a dealer may temporarily disable the feature for all key-cycles if low-voltage battery reporting is not wanted or needed on the dealer lot. This may be due to the dealer having a battery charge regimen in place for vehicles 100 on the dealer lot.

Similar options may be available for the use of remote engine starts to recharge the LV battery 114. If the vehicle 100 is in an enclosed space, remote-start events may be overridden to be disabled by the system controller.

With respect to the initialization, the system controller may initialize to zero a HV_LV_batt_energy_transfer_count variable indicative of the number of energy transfers from the HV battery 110 to the LV battery 114 via the converter 126. The system controller may also initialize to zero a Remote_start_LV_batt_charge_count variable indicative of the number of remote start operations of the vehicle 100.

At 308, the system controller resets the LV battery SoC timer. In an example, the system controller may reset a LV_SoC_monitor_timer variable or object and may further set the LV_SoC_monitor_timer to proceed to count. At 310, the system controller determines whether the LV SoC monitor timer has reached a LV SoC monitor interval at which the low-voltage battery SoC will be checked when the vehicle is key-off. In an example, the system controller may compare the LV_SoC_monitor_timer to determine whether it exceeds a LV_SoC_monitor_interval. The timing of the LV_SoC_monitor_interval may be configurable by the driver/customer and/or dealer. If the LV_SoC_monitor_timer does not exceed the LV_SoC_monitor_interval, control remains at operation 310. If the LV_SoC_monitor_timer does exceed the LV_SoC_monitor_interval, control passes to operation 312.

At 312, the system controller reads the current LV battery 114 SoC. In an example, the system controller may access the battery monitor sensor 124 to receive a SoC value (e.g., via the BCM 134). The SoC value may, for instance, be a voltage value that may be used alone or in combination with other factors (e.g., ambient temperature) to compute the SoC.

At 314, the system controller determines whether the current SoC of the LV battery 114 is less than a threshold value. In an example, the system controller reads the threshold value from the request_LV_battery_recharge_threshold variable. The SoC threshold at which the notification process is started may be calibrateable. The calibration may be used to adjust the duration between the time that the customer is first notified to recharge the battery and the time when the vehicle can no longer be started. During that period, a series of notifications may be sent to the customer. This battery-recharge-countdown provides the customer advance notice of a potential issue, and allows them sufficient time to make appropriate arrangements to resolve the issue. If the current SoC is less than the value, the system controller passes control to operation 316. If not, the system controller passes control back to operation 308.

At 316, the system controller determines whether ambient temperature supports the transfer of energy to the LV battery 114. In an example, the system controller may access the temperature sensor 136 to identify a temperature of the LV battery 114 and/or surrounding environment. Based on the temperature, the system controller determines whether charging of the LV battery 114 is feasible, as extreme cold or high heat may reduce charge acceptance of the LV battery 114. For one example lead acid type LV battery 114, charging may be unavailable below negative 20° Celsius or above 50° Celsius. If the LV battery 114 is at a temperature for which charge can be accepted, control passes to operation 318. If not, control returns to operation 308. This return to operation 308 may be done, for example, to suppress charge warnings to retail customers when the temperature is too low to correct the low charge condition.

At 318, the system controller determines whether remote energy transfers are enabled. In an example, the system controller accesses a remote_energy_transfers_enabled logical flag, which is set to a first value (e.g., TRUE) to enable the use of high-voltage-to-low-voltage battery energy transfers, and is set to a second value (e.g., FALSE) to disable the use of high-voltage-to-low-voltage battery energy transfers. If transfers are enabled, control passes to operation 402 of the process 400. If not, control passes to operation 320.

At 320, the system controller determines whether remote start battery charging is enabled. In an example, the system controller accesses a remote_start_batt_charging_enabled logical flag, which is set to a first value (e.g., TRUE) to enable use of remote engine starts to charge the low-voltage battery, and is set to a second value (e.g., FALSE) to disable use of remote engine starts to charge the low-voltage battery. If remote starts are enabled, control passes to operation 602 of the process 600. If not, control passes to operation 502 of the process 500.

Figure 4:
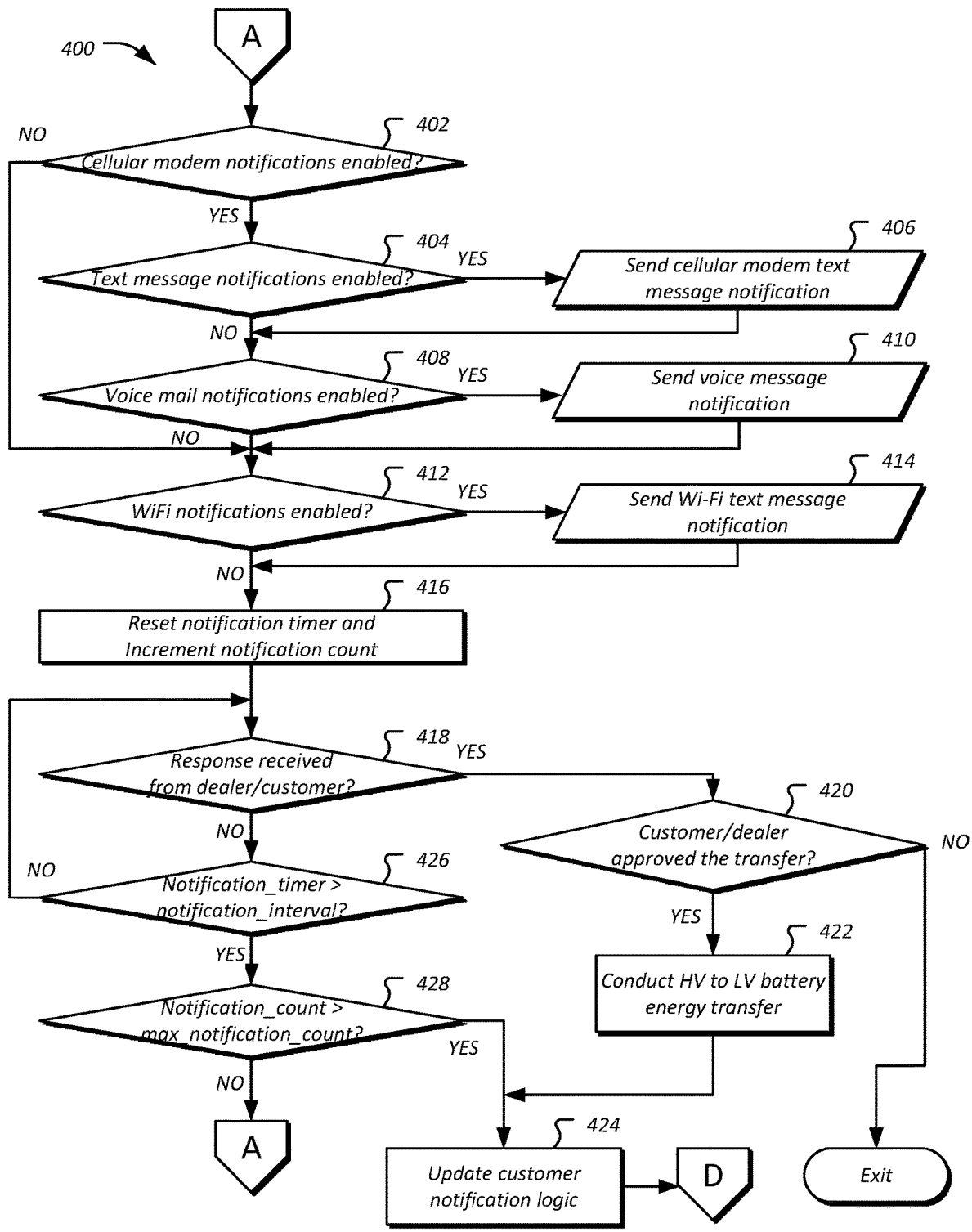
FIG. 4 illustrates an example process for notification to recharge the low-voltage battery and requesting permission to use a low-voltage-to-high-voltage battery energy transfer to recharge the low-voltage battery.

FIG. 4 illustrates an example process 400 for notification to recharge the LV battery 114 and requesting permission to use a low-voltage-to-high-voltage battery energy transfer to recharge the LV battery 114.

At 402, the system controller determines whether cellular modem notifications are enabled. If a vehicle 100 includes a cellular modem 118, this feature may provide text messages and/or voice messages that the LV battery 114 requires charging. In an example, the system controller accesses a cellular_modem_notifications_enable logical flag, which is set to a first value (e.g., TRUE) to enable use of the cellular modem to send notifications to the customer, and to a second value (e.g., FALSE) to disable use of the cellular modem to send notifications to the customer. If cellular modem notifications are enabled, control passes to operation 404. If not, control passes to operation 412.

At 404, the system controller determines whether text message notifications are enabled. In an example, the system controller accesses a text_message_notifications_enable logical flag, which is set to a first value (e.g., TRUE) to enable use of the cellular modem 118 to send text message notifications to the customer, and to a second value (e.g., FALSE) to disable use of the cellular modem to send text message notifications to the customer. If text message notifications are enabled, control passes to operation 406. If not, control passes to operation 408.

At 406, the system controller sends a text message notification using the cellular modem 118. In an example, the system controller accesses the contact_address variable or parameter to receive the phone number, email address, or other contact information for the user. The text message notification may include an indication that the LV battery 114 of the vehicle 100 should be recharged within a specific period of time (e.g., within three days) to allow the vehicle 100 to continue to be started. The notification may further indicate that this is a normal event not requiring a trip to the dealership for service. The notification may further include instructions regarding how to perform the recharge event. These instructions may include, for example, to run the engine 108 of the vehicle 100 for a specified period of time (e.g., thirty minutes). For plug-in hybrid (PHEV) vehicles 100 and battery-electric (BEV) vehicles 100, the instructions may indicate for the user to connect the vehicle 100 to an external battery charger. If a remote starter is available, it can be used to recharge the LV battery 114 if the vehicle 100 is in an open space. At dealerships and vehicle assembly plants, the instructions may indicate for the user to connect the vehicle 100 to an external charger of the LV battery 114. The notification may also include a statement that the recharge action will allow the LV battery 114 to support the vehicle 100 for a selected number of days before the LV battery 114 may again require recharge. The notification may also indicate that HV-LV battery energy transfers will reduce vehicle fuel economy for a short period of time. After operation 406, control passes to operation 408.

At 408, the system controller determines whether voice mail notifications are enabled. In an example, the system controller accesses a voice_mail_notifications_enable logical flag, which is set to a first value (e.g., TRUE) to enable use of the cellular modem to send voice mail notifications to the customer, and to a second value (e.g., FALSE) to disable use of the cellular modem to send voice mail notifications to the customer. If voice mail notifications are enabled, control passes to operation 410. If not, control passes to operation 412.

At 410, the system controller sends a voice mail notification using the cellular modem 118. The voice mail notification may include contents such as described above with respect to the text message notification. After operation 410, control passes to operation 412.

At 412, the system controller determines whether WiFi notifications are enabled. In an example, the system controller accesses a WiFi_notifications_enabled logical flag, which is set to a first value (e.g., TRUE) to enable use of WiFi to send text message notifications to the customer, and to a second value (e.g., FALSE) to disable use of WiFi to send text message notifications to the customer. If WiFi notifications are enabled, control passes to operation 414. If not, control passes to operation 416.

At 414, the system controller sends a text message notification using the WiFi modem 120. The WiFi text message notification may include contents such as described above with respect to the cellular text message notification of operation 406. After operation 414, control passes to operation 416.

At 416, the system controller resets the notification timer and notification count. In an example, the system controller resets to zero a notification timer variable or parameter used by the system controller to periodically send notifications to the customer if the customer has not responded to prior notification messages. In another example, the system controller increments a notification count set to a number of successive notification messages that have been sent.

At 418, the system controller determines whether a response was received from the dealer or customer. In an example, the system controller may monitor for responses to the notification. If a response to the notification is received, control passes to operation 420. Otherwise, control passes to operation 426.

At 420, the system controller determines whether the response indicates an approval of the transfer. In an example, if a positive response is received from the recipient of the notification (e.g., a dealer or customer), the transfer is approved, and the LV battery 114 is recharged. If the response indicates approval to perform the transfer, control passes to operation 422. Otherwise, the process 400 exits. In other examples, instead of an exit the process 400 returns to operation 304 of the process 300.

At operation 422, the system controller conducts a transfer of power from the HV battery 110 to the LV battery 114. This transfer may be performed, in an example, using the DC/DC converter 126. After operation 422, control passes to operation 424.

At 424, the system controller performs an update of the customer notification logic. After an HV-LV notification event, several next steps are possible depending on the outcome of the event. For instance, if an HV-LV energy transfer was performed, the system controller may decide whether additional transfers will be permitted. The system controller can be calibrated to allow energy transfers whenever there is energy available in the HV battery 110, or for a fixed number of times, or just once. If the transfer was declined, and remote engine 108 starts are possible, the system controller may proceed to prompt the customer for permission to perform a remote engine 108 start event. If the transfer was declined, and remote starts are not possible or enabled, the system controller may send a final notification to the customer to star the engine (e.g., for 30 minutes) or connect the vehicle 100 to an external charger. If no response was received, the system controller may elect to perform a retry strategy. One or more of these actions may be performed at these operations, but are not shown as a process for the sake of brevity. After operation 424, control returns to operation 304 of the process 300.

At 426, the system controller determines whether the notification time has exceeded the notification interval. The system controller may access a notification_interval variable or parameter to retrieve the notification interval timer value. In an example, if no response is received by the time the notification_timer exceeds the notification_interval, control passes to operation 428. If the notification_timer has not yet expired, control passes to operation 418.

At 428, the system controller determines whether the notification count has exceeded the maximum notification count. In an example, the notifications may be resent a calibrateable number of times. The system controller may access a max_notification_count variable or parameter to retrieve the maximum number of notification messages to the customer, and may access a notification_count variable or parameter to retrieve the current number of notification messages to the customer. If the notification_count exceeds the max_notification_count, control passes to operation 424 to provide an update. Otherwise, control returns to operation 402.

Figure 5:
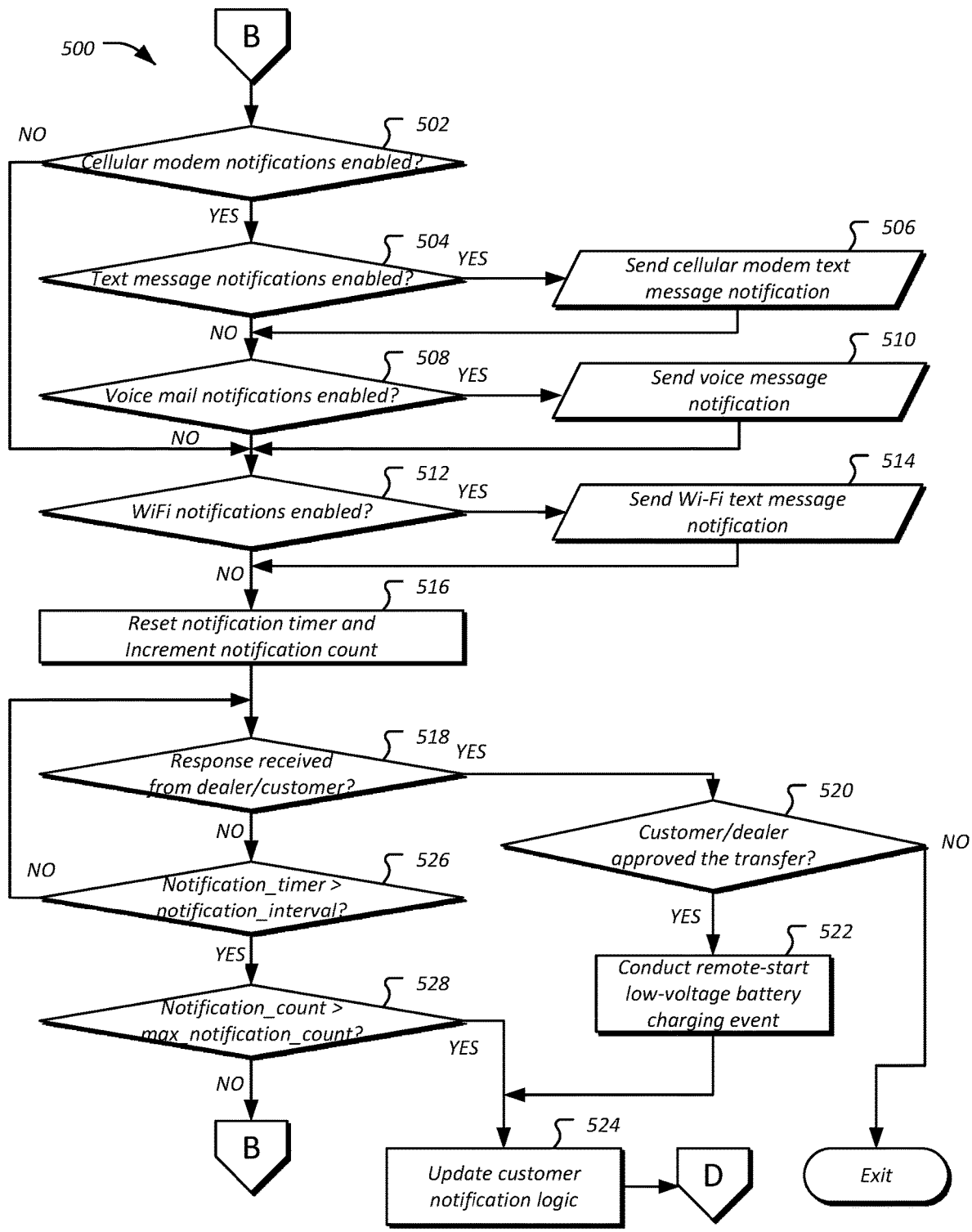
FIG. 5 illustrates an example process for notification to remote start the engine of the vehicle to recharge the LV battery.

FIG. 5 illustrates an example process 500 for notification to remote start the engine 108 of the vehicle 100 to recharge the LV battery 114. It should be noted that the operations 502-528 of the process 500 are consistent with the operations 400-428 of the process 400, with the exception that operation 522 charges the LV battery 114 using the remote start of the engine 108 instead of via transfer from the HV battery 110.

Figure 6:
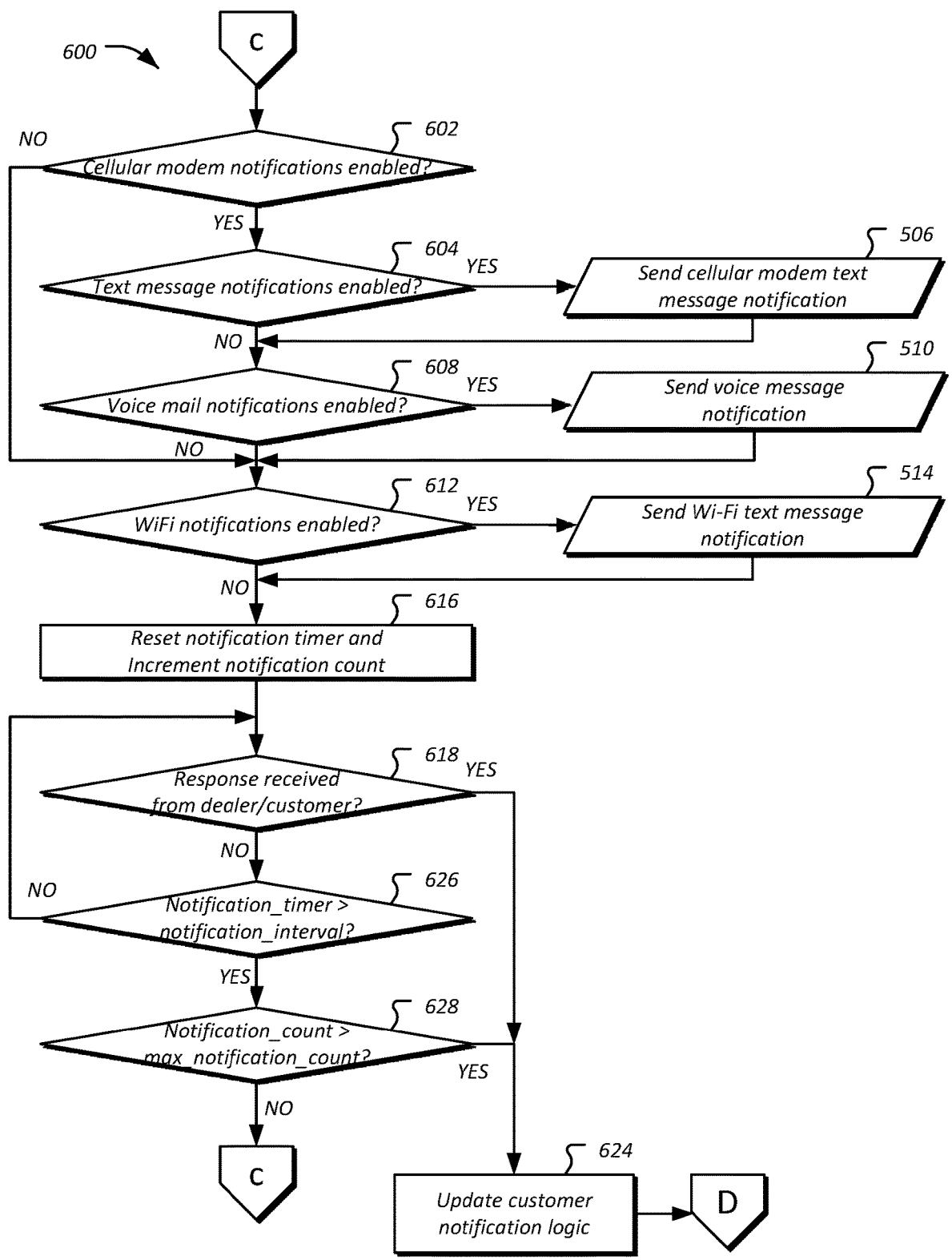
FIG. 6 illustrates an example process for connect-to-external-charger notification.

FIG. 6 illustrates an example process 600 for connect-to-external-charger notification. It should be noted that operations 602-618 and 624-628 are consistent with the operations 400-428 of the process 500, with the exception that the indicated action is to prompt the customer to either restart the engine 108 to connect the vehicle 100 to an external charger (e.g., of the HV battery 110 or the LV battery 114). As such, the operations relating to approval of the transfer and the performance of the transfer are inapplicable.

By using the system controller and processes described herein, the dealer and/or customer may be alerted when the low-voltage battery SoC is at a low level. Using this functionality, certain higher-level strategies may additionally be performed to charge the LV battery 114. For instance, in a given key-off cycle, the system controller may perform a configurable number of automatic charges of the LV battery 114 (e.g., one, two, five, one per week, etc.), where if if more charges are required, those additional low SoC conditions may be alerted to the user.

Computing devices described herein generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
 a low-voltage battery;
 a high-voltage battery;
 a converter that decreases voltage from the high-voltage battery to the low-voltage battery; and
 a system controller programmed to
  use the converter, in a key-off cycle, to automatically charge the low-voltage battery a calibrated number of times in the key-off cycle that the low-voltage battery drops below a predefined state-of-charge threshold, the calibrated number of times being at least once in the key-off cycle, and
  responsive to the low-voltage battery dropping below the threshold after the calibrated number of times have occurred in the key-off cycle, send a wireless notification to a contact address for the vehicle indicating a low state of charge condition of the low-voltage battery.

2. The vehicle of claim 1, wherein the system controller is further programmed to use a cellular modem of the vehicle to send a text message over a wide-area network to an address of a user of the vehicle indicating that the low-voltage battery had dropped below the threshold.

3. The vehicle of claim 1, wherein the system controller is further programmed to use a cellular modem of the vehicle to send a voice mail message over a wide-area network to an address of a user of the vehicle indicating that the low-voltage battery had dropped below the threshold.

4. The vehicle of claim 1, wherein the system controller is further programmed to:
 identify that the vehicle is connected to a local-area network of a user of the vehicle; and
 send a message over the local-area network to an address of a user of the vehicle indicating that the low-voltage battery had dropped below the threshold.

5. The vehicle of claim 1, wherein the system controller is further programmed to:
 periodically compute a state of charge of the low-voltage battery, and
 send the wireless notification to a user responsive to the state of charge.

6. The vehicle of claim 1, wherein the wireless notification includes instructions regarding how to perform a recharge event, and that the recharge event does not require vehicle service.

7. The vehicle of claim 1, wherein the wireless notification includes instructions for a user to confirm that the vehicle is outside of an enclosed area before an engine of the vehicle is started to charge the low-voltage battery.

8. The vehicle of claim 1, wherein the wireless notification includes information indicating that a transfer of energy from the high-voltage battery to the low-voltage battery will temporarily reduce vehicle fuel economy.

9. The vehicle of claim 1, wherein the calibrated number of times is one.

10. The vehicle of claim 1, wherein the calibrated number of times is two.

11. A method comprising:
 automatically charging a low-voltage battery of a vehicle, using a converter decreasing voltage provided from a high-voltage battery of the vehicle to the low-voltage battery to charge the low-voltage battery, responsive to a periodically computed state of charge of the low-voltage battery falling below a predefined threshold a first time in a key-off cycle;
 sending a notification to a predefined contact address responsive to the periodically computed state of charge of the low-voltage battery falling below the predefined threshold a second time in the key-off cycle; and
 using the converter to charge the low-voltage battery a second time responsive to receipt from the contact address of a response indicating approval of the charge.

12. The method of claim 11, further comprising using a cellular modem of the vehicle to send the notification as a text message over a wide-area network to an address of a user of the vehicle indicating that the low-voltage battery had dropped below the threshold.

13. The method of claim 11, further comprising using a cellular modem of the vehicle to send the notification as a voice mail message over a wide-area network to an address of a user of the vehicle indicating that the low-voltage battery had dropped below the threshold.

14. The method of claim 11, further comprising sending the notification as a message over a local-area network to an address of a user of the vehicle indicating that the low-voltage battery had dropped below the threshold responsive to identifying that the vehicle is connected to a local-area network of a user of the vehicle.

15. A non-transitory computer-readable medium comprising instructions that, when executed by a processor, cause the processor to:
use a converter configured to decrease voltage provided from a high-voltage battery of a vehicle to charge a low-voltage battery of the vehicle, in a key-off cycle, to automatically charge the low-voltage battery a calibrated number of times in the key-off cycle that the low-voltage battery drops below a predefined state-of-charge threshold, the calibrated number of times being at least once in the key-off cycle, and
send a message responsive to the low-voltage battery dropping below the threshold after the calibrated number of times have occurred in the key-off cycle, the sending including
responsive to identification that the vehicle is connected to a local-area network, send the message over the local-area network to an address of a user of the vehicle indicating that a low-voltage battery has dropped below the threshold;
responsive to identification that the vehicle is connected to a wide-area network but not the local-area network, use a cellular modem of the vehicle to send the message over the wide-area network to the address; and
decrease, using the converter, voltage provided from a high-voltage battery of the vehicle to the low-voltage battery to charge the low-voltage battery responsive to receipt from the address of a response indicating approval of the charge.

16. The medium of claim 15 further comprising instructions that, when executed by the processor, cause the processor to include in the message an explanation of how to perform a charge event, and that the charge event does not require vehicle service.

17. The medium of claim 15 further comprising instructions that, when executed by the processor, cause the processor to include in the message an explanation for the user to confirm that the vehicle is outside of an enclosed area before an engine of the vehicle is started to charge the low-voltage battery.

18. The medium of claim 15 further comprising instructions that, when executed by the processor, cause the processor to include in the message an explanation indicating that a transfer of energy from the high-voltage battery to the low-voltage battery will temporarily reduce vehicle fuel economy.

19. The vehicle of claim 1, wherein the system controller is further programmed to avoid charging the low-voltage battery responsive to a determination using data from a temperature sensor that the ambient temperature does not support a transfer of energy to the low-voltage battery.

* * * * *